United States Patent [19]

Yatka

[11] Patent Number: 5,296,244
[45] Date of Patent: Mar. 22, 1994

[54] CHEWING GUM CONTAINING ASPARTAME AND PALATINOSE OLIGOSACCHARIDE

[75] Inventor: Robert J. Yatka, Orland Park, Ill.

[73] Assignee: Wm. Wrigley Jr. Company, Chicago, Ill.

[21] Appl. No.: 969,112

[22] Filed: Oct. 30, 1992

[51] Int. Cl.$^5$ .................................. A23G 3/30
[52] U.S. Cl. .................................. 426/3; 426/548; 426/658; 426/804
[58] Field of Search .................................. 426/3-6, 426/548, 658, 654, 804

[56] References Cited

U.S. PATENT DOCUMENTS

| | | |
|---|---|---|
| 3,865,957 | 2/1975 | Schieweck et al. .................. 426/548 |
| 3,912,804 | 10/1975 | Schiweck .................................. 424/9 |
| 4,233,439 | 11/1980 | Schiweck et al. .................. 426/548 |
| 4,359,531 | 11/1982 | Bucke et al. ........................ 426/658 |
| 4,382,963 | 5/1983 | Klose et al. ............................. 426/3 |
| 4,556,429 | 12/1985 | Takazoe et al. ...................... 426/658 |
| 4,587,119 | 5/1986 | Bucke et al. ............................. 426/3 |
| 4,695,326 | 9/1987 | Takazoe et al. ...................... 426/658 |
| 4,765,991 | 8/1988 | Cherukuri et al. ...................... 426/3 |
| 4,786,722 | 11/1988 | Zehner .................................. 426/658 |
| 4,792,453 | 12/1988 | Reed et al. ............................. 426/5 |
| 4,883,685 | 11/1989 | Kondou .................................. 426/658 |
| 4,908,212 | 3/1990 | Kwon et al. ............................. 426/3 |
| 4,948,616 | 8/1990 | Iijima et al. ........................... 426/658 |
| 4,961,935 | 10/1990 | Cherukuri et al. ...................... 426/3 |
| 4,976,972 | 12/1990 | Patel et al. ............................. 426/3 |
| 4,980,127 | 12/1990 | Parris et al. .......................... 420/418 |
| 4,983,405 | 1/1991 | Cherukuri et al. ...................... 426/3 |
| 4,988,518 | 1/1991 | Patel et al. ............................. 426/5 |
| 5,041,293 | 8/1991 | Patel et al. ............................. 426/3 |
| 5,087,460 | 2/1992 | Cherukuri et al. ...................... 426/5 |
| 5,135,761 | 8/1992 | Dave et al. ............................. 426/5 |

FOREIGN PATENT DOCUMENTS

| | | |
|---|---|---|
| 0325090A2 | 7/1989 | European Pat. Off. . |
| 0351972A1 | 1/1990 | European Pat. Off. . |
| 0351973A2 | 1/1990 | European Pat. Off. . |
| 0390438A1 | 10/1990 | European Pat. Off. . |
| 0483755A2 | 5/1992 | European Pat. Off. . |
| 57-86246 | 9/1982 | Japan . |
| 58-138355 | 8/1983 | Japan . |
| 60-09466 | 1/1985 | Japan . |
| 60-248137 | 12/1985 | Japan . |
| 62-148496 | 7/1987 | Japan . |
| 89-19860 | 4/1989 | Japan . |
| 3-39100 | 2/1991 | Japan . |
| 3-240463 | 10/1991 | Japan . |
| 4-312595 | 11/1992 | Japan . |
| 4-316455 | 11/1992 | Japan . |
| 59-173066 | 9/2984 | Japan . |
| WO90/06317 | 6/1990 | PCT Int'l Appl. . |
| WO91/15941 | 10/1991 | PCT Int'l Appl. . |
| WO92/22217 | 12/1992 | PCT Int'l Appl. . |
| 2063268A | 6/1981 | United Kingdom . |
| 2066639A | 7/1981 | United Kingdom . |
| 2223944A | 4/1990 | United Kingdom . |

OTHER PUBLICATIONS

Chapter 6, Palatinose—An Isomeric Alternative to Sucrose, by Ichiro Takazoe, from a book entitled, *Progress in Sweeteners*, edited by T. H. Grenby, 1989, pp. 143–167.

"Coloration and Other Chemical Changes in the Manufacture of Palatinose Candy," by Yoshikazu Nakajima and Takeo Mizutani, translated from the *Journal of the Society for Research into Sugar Refining Techniques*, No. 36, pp. 95–103 (1988).

(List continued on next page.)

*Primary Examiner*—Jeanette Hunter
*Attorney, Agent, or Firm*—Willian Brinks Hofer Gilson & Lione

[57] ABSTRACT

Chewing gum products containing palatinose oligosaccharide and methods of making such gum products are disclosed. In one embodiment, aspartame is used to sweeten the gum composition, and palatinose oligosaccharide is provided in an amount effective to stabilize the aspartame such that after eight weeks of storage at 85° F., at least 5% less aspartame decomposes than would have decomposed if the palatinose oligosaccharide were not included.

15 Claims, 5 Drawing Sheets

OTHER PUBLICATIONS

"Production and Properties of Palatinose-Oligosaccharide," by Kazui Ogasa, Akio Masubuchi, Takeo Mizutani, Yoshikazu Nakajima and Koji Nishio, translated from the *Journal of the Society for Research into Sugar Refining Techniques*, No. 37, pp. 85-91 (1989).

"Properties and Use of Palatinose-Oligosaccharide," by Takeo Mizutani, translated from *New Food Industry*, vol. 33, No. 2 (1991).

"Production and Applications of Palatinose-Oligosaccharide," by Takeo Mizutani, Mitsui Sugar Co., Ltd., translated from Gekkan Fudo Kemikaru, Oct. 1989, pp. 67-72.

CHEWING GUM CONTAINING ASPARTAME AND PALATINOSE OLIGOSACCHARIDE

CROSS REFERENCE TO RELATED APPLICATIONS

The present application is a continuation-in-part of application Ser. No. PCT/US92/05217, filed Jun. 19, 1992, published as WO 92/22217 which in turn is a continuation-in-part of application Ser. No. PCT/US91/04349, filed on Jun. 19, 1991, published as WO 91/15941. Both of these applications are incorporated herein by reference.

BACKGROUND OF THE INVENTION

The present invention relates to improved compositions of chewing gum. More particularly, the invention relates to improving chewing gum by the use of specific bulking agents in sugar and non-sugar chewing gum products to give improved texture, moisture absorption properties, and improved shelf-life properties, including aspartame stability. The improved chewing gum compositions may also be used in a variety of chewing gum products, such as confectionery coated chewing gum products.

In recent years, efforts have been devoted to replace sugar and sugar syrups normally found in chewing gum with other carbohydrates and non-carbohydrates. Non-sugar or sugar-free chewing gum, which is growing in popularity, uses sugar alcohols or polyols to replace sugar and sugar syrups. The most popular polyols are sorbitol, mannitol and xylitol. New polyols are being developed using new technology to replace these polyols. New polyols have various unique properties which can improve the taste, texture, and shelf-life properties of chewing gum for consumers.

The non-sugar polyols have the advantage of not contributing to dental caries of consumers, as well as being able to be consumed by diabetics. However, all polyols have the disadvantage of causing gastrointestinal disturbances if consumed in too great of a quantity. Therefore it would be a great advantage to be able to use a carbohydrate or carbohydrate-like food ingredient for chewing gum that would act as a bulking agent, but not contribute to dental caries nor cause gastrointestinal disturbances.

One such bulking agent is called palatinose (or isomaltulose). This bulking agent or bulk sweetener, which is not approved for use in food products or in chewing gum in the U.S., is being considered by the US-FDA for GRAS Affirmation. The bulk sweetener is approved for use in Japan and is being used in chewing gum. Although a sugar, palatinose does not contribute to dental caries, nor does it cause gastrointestinal disturbances. Palatinose has also been polymerized to yield another similar bulking agent ingredient, called palatinose oligosaccharide (POS).

The manufacture of palatinose is disclosed in UK Patent No. 2 063 268, U.S. Pat. No. 4,359,531, and EPO Patent Publication No. 0 483 755.

U.S. Patent No. 4,587,119 and UK Patent No. 2 066 639 disclose the replacement of sucrose with palatinose in various food type products, including chewing gum.

Combinations of palatinose with high-potency sweeteners are disclosed in EPO Patent Publication No. 0 390 438 (using sucralose) and Japanese Patent Disclosures Nos. 83-138355 (using aspartame) and 1991-240463.

Results of cariogenic studies of palatinose are disclosed in U.S. Pat. Nos. 4,556,429 and 4,695,326 palatinose inhibits the formation of insoluble glucan from sucrose and thus reduces dental plaque.

The use of palatinose in chewing gum is disclosed in U.S. Pat. No. 4,976,972, UK Patent No. 2 223 944 and Japanese Patent Publications Nos. 82-86246, 85-248137, 89-19860, 1991-240463 and 1991-39100.

Hydrogenated isomaltulos is disclosed in U.S. Pat. Nos. 3,865,957 and 4,233,439 and in Japanese Patent Publication No. 87-148496. Chewing gums using hydrogenated isomaltulose are disclosed in U.S. Pat. Nos. 4,792,435 and 4,961,935.

Palatinose oligosaccharide (POS) is disclosed in Japanese Patent Publication No. 85-09466.

More information on palatinose can be found in Progress in Sweeteners, edited by T. H. Grenby, published by Elsevier Science Publishers Ltd., England in 1989, Chapter 6, pages 143–167.

SUMMARY OF THE INVENTION

Chewing gum products containing palatinose oligosaccharide and methods of making such gum products have been invented. In a first aspect of the invention, aspartame is used to sweeten the gum composition, and palatinose oligosaccharide is provided in an effective amount to stabilize the aspartame such that after eight weeks of storage at 85° F., at least 5% less aspartame decomposes than would have decomposed if the palatinose oligosaccharide were not included.

In a second aspect, the invention is a chewing gum composition comprising from about 5% to about 95% of a gum base; about 5% to about 90% of a bulking agent; about 0.1% to about 10% of a flavor agent and a formulated amount of unencapsulated aspartame, wherein the bulking agent includes palatinose oligosaccharide in amounts effective to stabilize the aspartame when the chewing gum is stored at 85° F. for at least eight weeks, at least 60% of the original, formulated amount of the aspartame is recoverable, the formulated amount of aspartame being about 10% to about 50% less than the amount of the aspartame which would have been needed to recover an equal amount of aspartame in the absence of the palatinose oligosaccharide stabilizer.

In a third aspect, the invention is a process for preparing and storing a chewing gum composition comprising formulating and storing a gum composition comprising from about 5% to about 95% of a gum base; about 5% to about 90% of a bulking agent; about 0.1% to about 10% of a flavor agent and a formulated, and at least partially sweetening, amount of unencapsulated aspartame, the bulking agent including, as a stabilizer for the aspartame, palatinose oligosaccharide in such amounts as to stabilize the aspartame so as to allow for the recovery from the chewing gum composition of at least 75% of the formulated amount of aspartame after normal commercial storage of the chewing gum composition for at least eight weeks.

In a fourth aspect, the invention is a chewing gum composition comprising about 5% to about 95% gum base, about 0.1% to about 10% of a flavoring agent, about 5% to about 90% bulking agent, the bulking agent comprising at least in part palatinose oligosaccharide, and sweetening amounts of aspartame.

Even though palatinose oligosaccharide is very similar to sucrose, it is not cariogenic, nor does it cause gastrointestinal disturbances, giving a highly consumer-acceptable chewing gum product.

DETAILED DESCRIPTION OF THE DRAWINGS AND PREFERRED EMBODIMENTS OF THE INVENTION

As used herein, the term "chewing gum" also includes bubble gum and the like. Unless otherwise specified, all percentages used herein are weight percents.

Palatinose is a carbohydrate bulking agent that is similar to sucrose, but low in sweetness intensity. Although palatinose is an isomer of sucrose, its sweetness intensity is only 42% of sucrose. Palatinose, also known as isomaltulose, is a crystalline reducing disaccharide with an $\alpha$-1,6 bond between glucose and fructose. The chemical name for palatinose is 6-0-$\alpha$-Dv glucopyranosyl-D-fructose.

Palatinose crystallizes with one water molecule per palatinose molecule, but the dehydrated form is not crystalline. Including water of crystallization, the molecular weight is 360. The melting point is 122°–123° C., which is much lower than sucrose at 182° C.

The United States Food and Drug Administration is now considering palatinose under a GRAS Affirmation petition. In Japan, palatinose is considered a food item. Palatinose is being marketed in the United States by Mitsui Sugar Co, Inc. of Tokyo, Japan. It is also available from palatinit Sussungsmittel GmbH through its U.S. representative in Elkhart, Ind.

Palatinose is available as a crystalline material that is 99% pure with its water of crystallization. In a variety of cariogenicity test, pure palatinose has been found to be non-cariogenic. Palatinose is also available as a palatinose syrup composed of palatinose, trehalulose and other carbohydrates. This syrup, however, is considered low-cariogenic. POS is considered similar to palatinose in that it is non-cariogenic. Any of these three forms of palatinose may be used in chewing gum, but the preferred form is POS when used with aspartame.

Commercially available POS, on a dry solids basis, is 48% palatinose and 50% oligosaccharides made by palatinose repolymerization with citric acid. It contains less than 5% moisture and has unique physical properties in that it is very hygroscopic, has low sweetness, has high water solubility, and is very thermostable.

Palatinose may be added to chewing gum in its crystalline/solid form or may be dissolved in water. Its solubility in water is about 30% at room temperature, but increases with increased temperature to about 65% at 80° C. Palatinose may be used in chewing gum as a texture and flavor modifier, bulking agent, and may improve texture, flavor and shelf-life properties. Palatinose may replace solids like sucrose, dextrose or lactose when used in its powder form, or may replace syrups when used in its liquid or syrup form. At levels of about 0.5% to about 25%, palatinose or POS may replace part of the solids in sugar gum or, as a liquid, all or part of the syrup in sugar gum. At higher levels of about 25% to about 90% of the gum formulation, palatinose and/or POS may replace all of the solids in a chewing gum formulation.

In its powder or liquid form, a sufficient quantity of POS can also stabilize aspartame. POS may replace solids like sucrose or dextrose in its powder form, or replace syrups in its liquid or syrup form. At levels above 10%, POS may replace significant quantities of sucrose and syrup. Because of the resulting lower sweetness, aspartame may be added, generally at a level of between about 0.005% and 1% of the gum. It has been found that aspartame is stabilized with POS, especially when the POS is used at a level of 10% or more of the gum. In preferred embodiments, an effective amount of POS is used in gums with sweetness imparting amounts of aspartame to stabilize the aspartame against decomposition during storage at 85° F. for eight weeks whereby at least 5% less aspartame decomposes into non-sweetening derivatives than would have decomposed if the POS were not included in the gum composition. Because aspartame has such high potency and is used at such low levels, and because of its high cost, even a 5% reduction in degradation is a significant benefit. Preferably the amount of aspartame formulated in the gum will be about 10% to about 50% less than the amount needed if the POS were absent. More preferably, the aspartame will be stabilized to allow a recovery of at least 75% of the formulated amount of aspartame after eight weeks of storage at normal storage conditions, or so that over 60%, more preferably over 80%, of the originally formulated amount is recoverable after eight weeks of storage at 85° F. While the aspartame contemplated will generally be unencapsulated, the term "unencapsulated" as used herein applies to aspartame which, even if treated or partially encapsulated, is still subject to some degradation in the gum formulation.

Although palatinose and POS are similar to sucrose and glucose polymers, their unique anti-caries properties suggest that they may be used in chewing gum formulations containing non-sugar ingredients. Non-sugar ingredients are alditols such as sorbitol, mannitol, xylitol, lactitol, hydrogenated isomaltulose, maltitol and hydrogenated starch hydrolyzates. These alditols are used in a variety of combinations to develop unique sugarless chewing gum formulations. Palatinose and POS may be used to replace the individual alditols or combinations of alditols. With partial replacement of one or more alditols, palatinose or POS can be used at levels of about 0.5-25%. If palatinose and POS replace a large amount or most of the alditols, this level may be about 25% to about 90% of the gum formulation.

Some sugar-free chewing gum formulations contain high levels of glycerin and are very low in moisture, i.e., less than about 2%. POS as a powder or liquid may replace part or all of the glycerin used in these types of formulations. At higher moisture levels (more than 2%) in sugar-free gum, a liquid sorbitol (70% sorbitol, 30% water) is used. When using POS, preferably sorbitol liquid should also be used to obtain soft textured gum formulations. Previous high moisture formulations containing liquid sorbitol were not made with aspartame, since the moisture caused degradation of aspartame. However, when sufficient POS (generally greater than about 10%) is added to a high moisture gum, aspartame is stabilized, and degradation is reduced or eliminated.

Recent advances use hydrogenated starch hydrolyzates (HSH) and glycerin preblended and co-evaporated to reduce moisture in some sugar-free gum formulations. Palatinose or POS may be used to replace part or all of the HSH/glycerin blends in chewing gum formulations. Aqueous palatinose or POS solids and/or POS syrup may also replace HSH in the preblend with glycerin and be co-evaporated with glycerin to obtain a low moisture, non-crystallizable blend. Combinations of palatinose or POS solids/syrup with alditols like sorbitol, maltitol, xylitol, lactitol and mannitol in aqueous form may also be blended with glycerin and co-evaporated for use in low-moisture, sugar-free gum.

Palatinose or POS may be used in gum formulations with hydrogenated starch hydrolyzates (HSH) without preblending with glycerin and co-evaporation. Low levels of moisture are not necessary to prevent degradation of aspartame when POS is used, so HSH syrups at about 20-30% moisture do not need to be modified to reduce moisture to improve aspartame stability.

Palatinose or POS bulk sweetener may also be co-dried with a variety of sugars such as sucrose, dextrose, lactose, fructose and corn syrup solids and used in a sugar-containing gum formulation. Palatinose or POS may be co-dried with a variety of alditols such as sorbitol, mannitol, xylitol, maltitol, hydrogenated isomaltulose and hydrogenated starch hydrolyzates and used in a sugar-free gum formulation. Co-drying refers to methods of co-crystallization and co-precipitation of palatinose or POS with other sugars and alditols, as well as co-drying by encapsulation, agglomeration, and absorption with other sugars and alditols.

POS may act as an encapsulating or agglomerating agent. POS may also be used to absorb other ingredients. POS may be able to encapsulate, agglomerate or entrap/absorb flavors and high-intensity sweeteners like aspartame, alitame, cyclamic acid and its salts, saccharin acid and its salts, acesulfame and its salts, sucralose, dihydrochalcones, thaumatin, monellin or combinations thereof. Encapsulation of high-intensity sweeteners with POS may improve the sweetener's shelf-life.

POS may be used with other bulk sweeteners and in combination give unique properties. POS may be co-dried as noted above with other bulk sweeteners like sucrose, dextrose, lactose, maltose, fructose, corn syrup solids, sorbitol, mannitol, xylitol, maltitol, hydrogenated isomaltulose and hydrogenated starch hydrolyzates for use in sugar and sugar-free chewing gum. Ingredients, including flavors, co-dried, encapsulated, agglomerated or absorbed on POS, may show faster release. However, encapsulation of flavors with POS may improve the shelf-life of the flavor ingredient.

The previously described palatinose or POS bulk sweetener may readily be incorporated into a chewing gum composition, preferably at a level of about 10% to about 60%, and more preferably about 15% to about 50%, of the gum compositions. The remainder of the chewing gum ingredients are noncritical to the present invention. That is, the bulk sweetener can be incorporated into conventional chewing gum formulations in a conventional manner. The palatinose or POS bulk sweeteners may be used in a sugar-free or sugar chewing gum to modify the sweetness thereof. The bulk sweetener may be used in either regular chewing gum or bubble gum. Higher levels of POS will reduce sweetness, thus allowing for its use in non-sweet flavored chewing gums, such as snack flavors or savory flavors.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 95% by weight of the gum. More preferably the insoluble gum base comprises between 10 and 50 percent by weight of the gum and most preferably about 20 to about 35% by weight of the gum.

The gum base typically also includes a filler component. The filler component may be calcium carbonate, magnesium carbonate, talc, dicalcium phosphate or the like. The filler may constitute between about 5 and about 60% by weight of the gum base. Preferably, the filler comprises about 5 to about 50% by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise softeners, sweeteners, flavoring agents and combinations thereof. The sweeteners often fill the role of bulking agents in the gum. The bulking agents generally comprise from about 5% to about 90%, preferably from about 20% to about 80%, and most preferably from about 30% to about 60% of the gum.

Softeners are added to the chewing gum in order to optimize the chewability and mouth feel of the gum. Softeners, also known in the art as plasticizers or plasticizing agents, generally constitute between about 0.5 to about 15.0% by weight of the chewing gum. Softeners contemplated by the present invention include glycerin, lecithin and combinations thereof. Further, aqueous sweetener solutions such as those containing sorbitol, hydrogenated starch hydrolyzates, corn syrup and combinations thereof may be used as softeners and binding agents in gum.

As mentioned above, the palatinose or POS bulk sweetener of the present invention may be used in sugar gum formulations. However, sugar-free formulations are also within the scope of the invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The palatinose or POS bulk sweetener of the present invention can also be used in combination with sugarless sweeteners. Generally sugarless sweeteners include components with sweetening characteristics but which are devoid of the commonly known sugars and comprise, but are not limited to, sugar alcohols such as sorbitol, mannitol, xylitol, hydrogenated starch hydrolyzates, maltitol and the like, alone or in any combination.

Depending on the particular sweetness release profile and shelf-stability needed, the palatinose or POS solid/syrup bulk sweeteners of the present invention can also be used in combination with coated or uncoated high-potency sweeteners.

A flavoring agent may be present in the chewing gum in an amount within the range of from about 0.1 to about 10.0 weight percent, and preferably from about 0.5 to about 3.0 weight percent of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with any syrup and a portion of the bulking agent/sweetener. Further portions of the bulking agent/sweetener may then be added to the mixer. A flavoring agent is typically added with the final portion of the bulking agent. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described. procedure may be followed

EXAMPLES

The following examples of the invention and comparative examples are provided by way of explanation and illustration.

The following Tables 1 through 8 are examples of gum formulations that demonstrate formula variations in which palatinose oligosaccharides (POS) may be used. Formulas with high levels of POS may also contain aspartame (APM), which is stabilized with POS.

Examples 1–3 in Table 1 demonstrates the use of POS in low moisture sugar formulations having less than 2% theoretical moisture:

TABLE 1

|  | EX. 1 | EX. 2 | EX. 3 |
|---|---|---|---|
| SUGAR | 48.9 | 25.0 | 0.0 |
| GUM BASE | 19.2 | 19.2 | 19.2 |
| CORN SYRUP[a] | 6.0 | 6.0 | 6.0 |
| DEXTROSE MONOHYDRATE | 10.0 | 10.0 | 10.0 |
| LACTOSE | 0.0 | 5.0 | 5.0 |
| GLYCERIN[b] | 4.9 | 8.7 | 8.6 |
| FLAVOR | 0.9 | 0.9 | 0.9 |
| POS | 10.0 | 25.0 | 50.0 |
| APM | 0.1 | 0.2 | 0.3 |

[a] Corn syrup is evaporated to 85% solids, 15% moisture
[b] Glycerin and syrup may be blended and co-evaporated Examples 4–6 in Table 2 demonstrate the use of POS in medium-moisture sugar formulations having about 2% to about 5% moisture.

TABLE 2

|  | EX. 4 | EX. 5 | EX. 6 |
|---|---|---|---|
| SUGAR | 43.5 | 25.0 | 0.0 |
| GUM BASE | 19.2 | 19.2 | 19.2 |
| CORN SYRUP[a] | 14.9 | 18.3 | 18.2 |
| DEXTROSE MONOHYDRATE | 10.0 | 10.0 | 10.0 |
| GLYCERIN[b] | 1.4 | 1.4 | 1.4 |
| FLAVOR | 0.9 | 0.9 | 0.9 |
| POS | 10.0 | 25.0 | 50.0 |
| APM | 0.1 | 0.2 | 0.3 |

[a] Corn syrup is evaporated to 85% solids, 15% moisture
[b] Glycerin and syrup may be blended and co-evaporated Examples 7–9 in Table 3 demonstrate the use of POS in high-moisture sugar formulations having more than about 5% moisture.

TABLE 3

|  | EX. 7 | EX. 8 | EX. 9 |
|---|---|---|---|
| SUGAR | 41.0 | 25.0 | 0.0 |
| GUM BASE | 24.0 | 24.0 | 24.0 |
| CORN SYRUP | 23.9 | 24.4 | 24.3 |
| GLYCERIN | 0.0 | 0.4 | 0.4 |
| FLAVOR | 2.0 | 1.0 | 1.0 |
| POS | 10.0 | 25.0 | 50.0 |
| APM | 0.1 | 0.2 | 0.3 |

Examples 10–12 in Table 4 and Examples 13–18 in Tables 5 and 6 demonstrate the use of POS in low- and high-moisture gums that are sugar-free. Low-moisture gums have less than about 2% moisture, and high-moisture gums have greater than 2% moisture.

TABLE 4

|  | EX. 10 | EX. 11 | EX. 12 |
|---|---|---|---|
| BASE | 25.5 | 25.5 | 25.5 |
| SORBITOL | 41.0 | 26.0 | 0.0 |
| MANNITOL | 12.0 | 12.0 | 13.0 |
| GLYCERIN | 9.9 | 9.8 | 9.7 |
| FLAVOR | 1.5 | 1.5 | 1.5 |
| POS | 10.0 | 25.0 | 50.0 |
| APM | 0.1 | 0.2 | 0.3 |

TABLE 5

|  | EX. 13 | EX. 14 | EX. 15 |
|---|---|---|---|
| BASE | 25.5 | 25.5 | 25.5 |
| SORBITOL | 41.0 | 26.0 | 0.0 |
| LIQUID SORBITOL* | 10.0 | 10.0 | 11.0 |
| MANNITOL | 10.0 | 10.0 | 10.0 |
| GLYCERIN | 1.9 | 1.8 | 1.7 |
| FLAVOR | 1.5 | 1.5 | 1.5 |
| POS | 10.0 | 25.0 | 50.0 |

TABLE 5-continued

| | EX. 13 | EX. 14 | EX. 15 |
|---|---|---|---|
| APM | 0.1 | 0.2 | 0.3 |

*Sorbitol liquid contains 70% sorbitol, 30% water

TABLE 6

| | EX. 16 | EX. 17 | EX. 18 |
|---|---|---|---|
| BASE | 25.5 | 25.5 | 25.5 |
| SORBITOL | 41.0 | 26.0 | 0.0 |
| HSH SYRUP* | 10.0 | 10.0 | 10.0 |
| MANNITOL | 7.9 | 7.8 | 8.7 |
| GLYCERIN** | 4.0 | 4.0 | 4.0 |
| FLAVOR | 1.5 | 1.5 | 1.5 |
| POS | 10.0 | 25.0 | 50.0 |
| APM | 0.1 | 0.2 | 0.3 |

*Hydrogenated starch hydrolyzate syrup
**Glycerin and HSH syrup may be blended or co-evaporated Table 7 shows sugar chewing gum formulations that can be made with various types of sugars.

TABLE 7

| | EX. 19 | EX. 20 | EX. 21 | EX. 22 | EX. 23 | EX.24 | EX. 25 | EX. 26 | EX. 27 | EX. 28 | EX. 29 | EX. 30 |
|---|---|---|---|---|---|---|---|---|---|---|---|---|
| GUM BASE | 19.2 | 19.2 | 19.2 | 19.2 | 19.2 | 19.2 | 19.2 | 19.2 | 19.2 | 19.2 | 19.2 | 19.2 |
| SUCROSE | 44.4 | 24.2 | 39.4 | 19.2 | 29.4 | 19.2 | 29.4 | 19.2 | 29.4 | 19.2 | 37.4 | 22.2 |
| GLYCERIN | 1.4 | 1.4 | 1.4 | 1.4 | 1.4 | 1.4 | 1.4 | 1.4 | 1.4 | 1.4 | 1.4 | 1.4 |
| CORN SYRUP | 14.0 | 14.0 | 14.0 | 14.0 | 14.0 | 14.0 | 14.0 | 14.0 | 14.0 | 14.0 | 11.0 | 11.0 |
| DEXTROSE | 5.0 | 5.0 | — | — | 10.0 | 5.0 | 10.0 | 5.0 | 10.0 | 5.0 | 10.0 | 5.0 |
| LACTOSE | 5.0 | 5.0 | 10.0 | 10.0 | — | — | — | — | — | — | — | — |
| FRUCTOSE | 5.0 | 5.0 | 10.0 | 10.0 | 10.0 | 5.0 | 10.0 | 5.0 | 10.0 | 5.0 | 5.0 | 5.0 |
| INVERT SUGAR | — | — | — | — | 10.0 | 10.0 | 10.0 | 10.0 | — | — | 5.0 | 5.0 |
| MALTOSE | — | — | — | — | — | — | — | — | 10.0 | 10.0 | — | — |
| CORN SYRUP SOLIDS | — | — | — | — | — | — | — | — | — | — | 5.0 | 5.0 |
| PEPPERMINT FLAVOR | 0.9 | 0.9 | 0.9 | 0.9 | 0.9 | 0.9 | 0.9 | 0.9 | 0.9 | 0.9 | 0.9 | 0.9 |
| POS | 5.0 | 25.0 | 5.0 | 25.0 | 5.0 | 25.0 | 5.0 | 25.0 | 5.0 | 25.0 | 5.0 | 25.0 |
| APM | 0.1 | 0.3 | 0.1 | 0.3 | 0.1 | 0.3 | 0.1 | 0.3 | 0.1 | 0.3 | 0.1 | 0.3 |

Any of the sugars may be combined with POS and co-dried to form unique combinations such as:

EXAMPLE 31

Dextrose and POS can be dissolved in water in a 2:1 ratio dextrose:POS and co-dried or co-precipitated and used in the formulas in Table 7.

EXAMPLE 32

POS and sucrose can be dissolved in water in a 1:1 ratio and co-dried or co-precipitated and used in the formulas in Table 7.

EXAMPLE 33

POS, sucrose and dextrose can be dissolved in water in a 1:1:1 ratio and co-dried or co precipitated and used in the formulas in Table 7.

EXAMPLE 34

POS, sucrose, dextrose and fructose can be dissolved in water at 25% of each ingredient and co-dried, and used in the formulas in Table 7.

EXAMPLE 35

POS, dextrose, fructose and lactose can be dissolved in water at 25% of each ingredient and co-dried, and used in the formulas in Table 7.

EXAMPLE 36

POS, dextrose, maltose and corn syrup solids can be dissolved in water at 25% of each ingredient and co-dried, and used in the formulas in Table 7.

EXAMPLE 37

POS, sucrose, dextrose, maltose and fructose can be dissolved in water at 20% of each ingredient and co-dried, and used in the formulas in Table 7.

Multiple combinations of POS with other sugars can be made in solution to form liquid concentrates that do not need to be co-dried, such as:

EXAMPLE 38

POS, corn syrup and glycerin can be dissolved in water at a ratio of 1:1:1, evaporated to a thick syrup and used in the formulas in Table 7.

EXAMPLE 39

POS, dextrose, fructose and invert syrup may be dissolved in water at 25% of each ingredient and evaporated to a thick syrup and used in the formulas in Table 7.

EXAMPLE 40

POS, dextrose, maltose and corn syrup solids may be dissolved in water at 25% of each component and evaporated to a thick syrup and used in the formulas in Table 7.

EXAMPLE 41

Glycerin is added to Example 39 at a ratio of 4:1 syrup to glycerin and evaporated to a thick syrup, and used in the formulas in Table 7.

EXAMPLE 42

Glycerin is added to Example 40 at a ratio of 2:1 syrup to glycerin and evaporated to a thick syrup, and used in the formulas in Table 7.

Table 8 shows chewing gum formulations that are free of sugar. These formulations can use a wide variety of non-sugar alditols, including Lycasin brand HSH syrup.

TABLE 8

| | EX. 43 | EX. 44 | EX. 45 | EX. 46 | EX. 47 | EX. 48 | EX. 49 | EX. 50 | EX. 51 | EX. 52 | EX. 53 | EX. 54 |
|---|---|---|---|---|---|---|---|---|---|---|---|---|
| GUM BASE | 25.5 | 25.5 | 25.5 | 25.5 | 25.5 | 25.5 | 25.5 | 25.5 | 25.5 | 25.5 | 25.5 | 25.5 |
| GLYCERIN | 1.9 | 1.7 | 1.9 | 1.7 | 1.9 | 1.7 | 7.9 | 7.7 | 7.9 | 1.7 | 2.7 | 1.7 |
| SORBITOL | 44.0 | 14.0 | 34.0 | 9.0 | 28.0 | — | 32.0 | 7.0 | 22.0 | 11.0 | 10.0 | — |

TABLE 8-continued

|  | EX. 43 | EX. 44 | EX. 45 | EX. 46 | EX. 47 | EX. 48 | EX. 49 | EX. 50 | EX. 51 | EX. 52 | EX. 53 | EX. 54 |
| --- | --- | --- | --- | --- | --- | --- | --- | --- | --- | --- | --- | --- |
| MANNITOL | — | 10.0 | 10.0 | 10.0 | 10.0 | 6.0 | 8.0 | 8.0 | 8.0 | — | — | — |
| SORBITOL LIQUID | 17.0 | 17.0 | — | — | — | — | 5.0 | — | — | — | — | — |
| LYCASIN | — | — | 17.0 | 12.0 | 8.0 | 10.0 | — | 5.0 | 5.0 | 5.0 | 10.0 | 10.0 |
| MALTITOL | — | — | — | 10.0 | — | — | — | 5.0 | — | — | — | — |
| XYLITOL | — | — | — | — | 15.0 | 15.0 | — | — | — | 15.0 | — | — |
| LACTITOL | — | — | — | — | — | — | 10.0 | 10.0 | 10.0 | — | — | — |
| PALATINIT* | — | — | — | — | — | — | — | — | 10.0 | 10.0 | 25.0 | 21.0 |
| FLAVOR | 1.5 | 1.5 | 1.5 | 1.5 | 1.5 | 1.5 | 1.5 | 1.5 | 1.5 | 1.5 | 1.5 | 1.5 |
| POS | 10.0 | 30.0 | 10.0 | 30.0 | 10.0 | 40.0 | 10.0 | 30.0 | 10.0 | 30.0 | 25.0 | 40.0 |
| APM | 0.1 | 0.3 | 0.1 | 0.3 | 0.1 | 0.3 | 0.1 | 0.3 | 0.1 | 0.3 | 0.3 | 0.3 |

*Palatinit brand hydrogenated isomaltulose

Any of the alditols can be combined with POS and co-dried to form unique combinations, such as:

EXAMPLE 55

POS and sorbitol can be dissolved in water in a ratio of 2:1 sorbitol:POS and co-dried and used in formulas in Table 8.

EXAMPLE 56

POS, sorbitol and mannitol can be dissolved in water at a ratio of 1:1:1, co-dried, and used in appropriate formulas in Table 8.

EXAMPLE 57

POS, mannitol and xylitol can be dissolved in water at a ratio of 1:1:1, co-dried, and used in appropriate formulas in Table 8.

EXAMPLE 58

POS, sorbitol and lactitol can be dissolved in water at a ratio of 1:1:1, co-dried, and used in appropriate formulas in Table 8.

EXAMPLE 59

POS, hydrogenated isomaltulose and sorbitol can be dissolved in water at a ratio of 1:1:1, co-dried, and used in appropriate formulas in Table 8.

EXAMPLE 60

POS and hydrogenated isomaltulose can be dissolved in water at a ratio of 1:1, co-dried, and used in appropriate formulas in Table 8.

EXAMPLE 61

POS, sorbitol, maltitol and xylitol may be blended at 25% of each ingredient and dissolved in water, co-dried, and used in appropriate formulas in Table 8.

Multiple combinations of POS with the various alditols can be made in solution to form liquid concentrates that do not need to be co-dried, such as:

EXAMPLE 62

POS, sorbitol, maltitol and Lycasin may be dissolved in water at 25% of each ingredient, evaporated to a thick syrup and used in the appropriate formulas in Table 8.

EXAMPLE 63

POS, xylitol, sorbitol and Lycasin can be dissolved in water at 25% of each ingredient, evaporated to a thick syrup, and used in the formulas in Table 8.

EXAMPLE 64

POS, sorbitol, lactitol and Lycasin can be dissolved in water at 25% of each ingredient, evaporated to a thick syrup, and used in the formulas in Table 8.

EXAMPLE 65

POS, Lycasin and glycerin can be dissolved in water at a ratio of 1:1:1, evaporated to a thick syrup and used in the formulas in Table 8.

EXAMPLE 66

Glycerin is added to Example 62 at a ratio of 4:1 syrup to glycerin, evaporated to a thick syrup, and used in formulas in Table 8.

EXAMPLE 67

Glycerin is added to Example 63 at a ratio of 4:1 syrup to glycerin, evaporated to a thick syrup, and used in formulas in Table 8.

EXAMPLE 68

Glycerin is added to Example 64 at a ratio of 4:1 syrup to glycerin, evaporated to a thick syrup, and used in formulas in Table 8.

Other high-intensity sweeteners such as acesulfame K, or the salts of acesulfame, cyclamate and its salts, saccharin and its salts, alitame, sucralose, thaumatin, monellin, dihydrochalcones, stevioside, glycyrrhizin and combinations thereof may be used with APM in any of the Examples listed in Tables 18–8. Since POS has less sweetness than some of the sugars used in sugar gum, and some of the alditols in sugar-free gum, a high-intensity sweetener may be needed to obtain the proper level of sweetness.

High-intensity sweeteners may also be modified to control their release in chewing gum formulations containing POS. This can be controlled by various methods of encapsulation, agglomeration, absorption, or a combination of methods to obtain either a fast or slow release of the sweetener. Sweetener combinations, some of which may be synergistic, may also be included in the gum formulations containing POS.

High-intensity sweeteners may also be combined with other high-intensity sweeteners, with or without encapsulation, agglomeration or absorption, and used in chewing gum. Examples are:

EXAMPLE 69

Aspartame and acesulfame K at a 1:1 ratio may be added to any of the formulas in Tables 1 through 8 at a level of 0.15% by replacing 0.15% of the POS.

EXAMPLE 70

Aspartame and alitame at a ratio of 9:1 aspartame:alitame may be added to any of the formulas in Tables 1 through 8 at a level of 0.1% by replacing 0.1% of the POS.

EXAMPLE 71

Aspartame and thaumatin at a ratio of 9:1 aspartame:thaumatin can be added to any of the formulas in Tables 1 through 8 at a level of 0.1% by replacing 0.1% of the POS.

EXAMPLE 72

Aspartame and sucralose in a ratio of 3:1 aspartame:sucralose can be added to any of the formulas in Tables 1 through 8 at a level of 0.3% by replacing 0.3% of the POS.

EXAMPLE 73

Aspartame and glycyrrhizin in a ratio of 1:14 aspartame:glycyrrhizin can be added to any of the formulas in Tables 1 through 8 at a level of 0.3% by replacing 0.3% of the POS.

As discussed above, the three types of palatinose ingredients that are available are palatinose crystalline, palatinose syrup (containing palatinose, trehalulose and other carbohydrates) and palatinose oligosaccharide (POS). These materials may be used exclusively in a variety of chewing gum formulations, as in Tables 9 and 10. The formulas with POS and APM will show improved APM stability.

TABLE 9

| | EX. 74 | EX. 75 | EX. 76 | EX. 77 | EX. 78 |
|---|---|---|---|---|---|
| GUM BASE | 19.2 | 25.5 | 25.5 | 25.5 | 40.0 |
| GLYCERIN | 1.7 | 1.7 | 6.7 | 6.7 | 1.7 |
| PALATINOSE CRYSTALLINE | 57.8 | 46.0 | 41.0 | 41.0 | 35.5 |
| PALATINOSE SYRUP* | 10.0 | 20.0 | 5.0 | — | 10.0 |
| POS | 10.0 | 5.0 | 20.0 | 25.0 | 10.0 |
| FLAVOR | 1.0 | 1.5 | 1.5 | 1.5 | 2.5 |
| APM | 0.3 | 0.3 | 0.3 | 0.3 | 0.3 |

*Palatinose syrup may be preblended with glycerin and coevaporated to reduce moisture.

TABLE 10

| | EX. 79 | EX. 80 | EX. 81 | EX. 82 |
|---|---|---|---|---|
| GUM BASE | 25.5 | 25.5 | 50.0 | 70.0 |
| GLYCERIN | 6.7 | 14.7 | 1.6 | 0.6 |
| PALATINOSE CRYSTALLINE | 26.0 | 28.0 | 35.5 | 20.0 |
| PALATINOSE SYRUP* | 20.0 | — | 10.0 | 4.0 |
| POS | 20.0 | 30.0 | — | 2.0 |
| FLAVOR | 1.5 | 1.5 | 2.5 | 3.0 |
| APM | 0.3 | 0.3 | 0.4 | 0.4 |

*Palatinose syrup may be preblended with glycerin and coevaporated to reduce moisture.

The formulations in Tables 9 and 10 do not contain other sugars or alditols. These formulations will give unique texture and flavor attributes. Along with aspartame, these formulations may also contain other high-intensity, artificial sweeteners, from about 0.02% to about 0.1% for sweeteners like alitame, thaumatin, and dihydrochalcones, and from about 0.1% to about 0.3% for sweeteners like sucralose, acesulfame, and saccharin. The formulations in Tables 9 and 10 without the other types of sugars and alditols will also have good non-cariogenic properties.

EXAMPLES 83–86

The following gum formulations were made:

| | EX. 83 | EX. 84 | EX. 85 | EX. 86 |
|---|---|---|---|---|
| BASE | 27.0 | 27.0 | 27.0 | 27.0 |
| SORBITOL | 40.2 | 38.7 | 32.5 | 20.9 |
| MANNITOL | 12.0 | 11.5 | 9.7 | 6.3 |
| GLYCERIN | 8.1 | 8.1 | 8.1 | 8.1 |
| SORBITOL LIQUID | 11.0 | 11.0 | 11.0 | 11.0 |
| PEPPERMINT FLAVOR | 1.3 | 1.3 | 1.3 | 1.3 |
| COLOR | 0.1 | 0.1 | 0.1 | 0.1 |
| APM | 0.3 | 0.3 | 0.3 | 0.3 |
| PALATINOSE | 0 | 2.0 | 10.0 | 25.0 |

Figure 1:
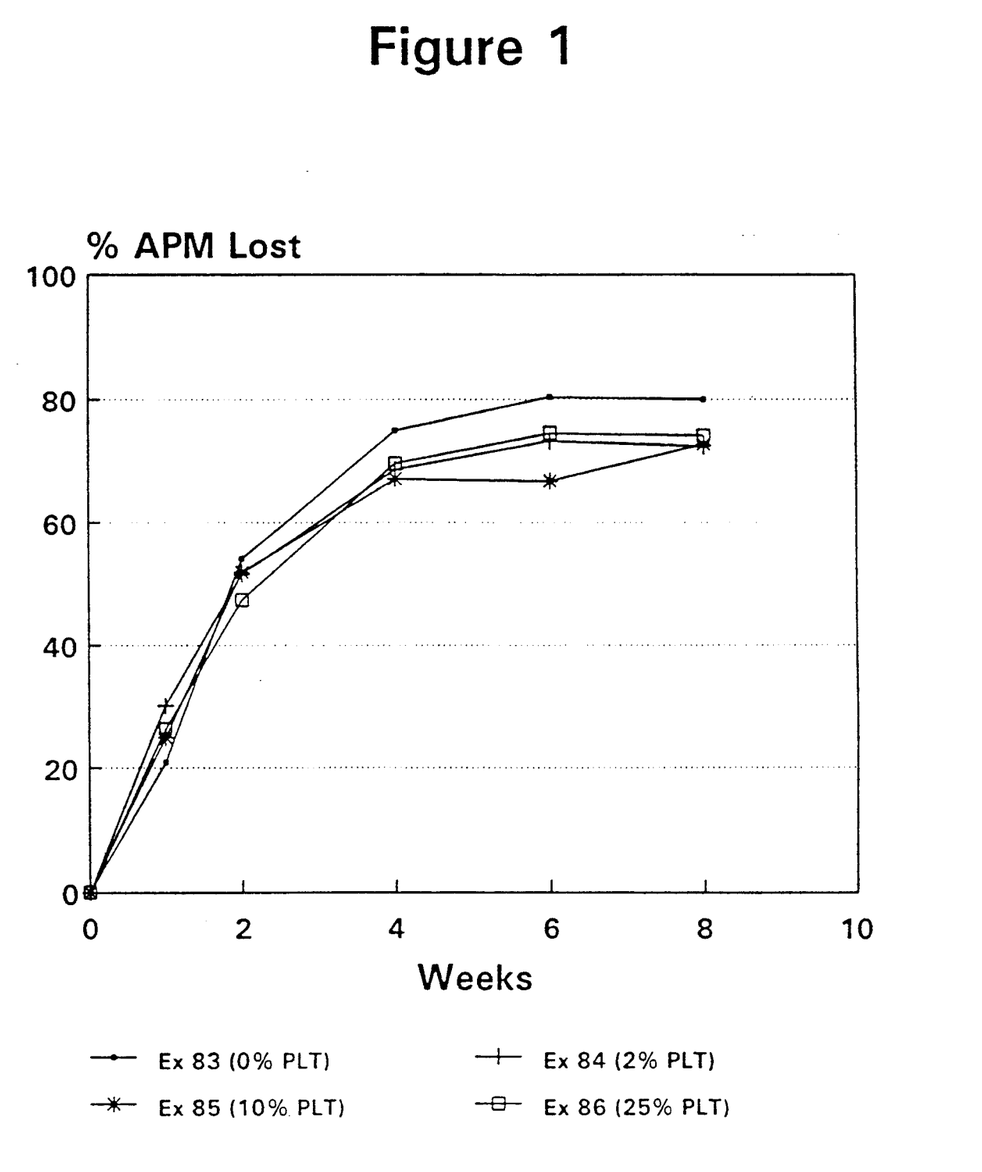
FIG. 1 shows test results of aspartame stability in gums made with sorbitol liquid and palatinose.

These formulas were made in a conventional lab mixer in a conventional manner on a lab scale and formed into square pellets. Samples of each formula were placed in six sealed pouches and stored at 85° F. for 0, 1, 2, 4, 6 and 8 weeks. Samples were then removed and analyzed for APM to determine degradation. The test results are shown in FIG. 1. The test results show virtually no increase in stability of APM with palatinose levels as high as 25%.

EXAMPLES 87–94

The following gum formulations were made:

| | EX. 87 | EX. 88 | EX. 89 | EX. 90 | EX. 91 | EX. 92 | EX. 93 | EX. 94 |
|---|---|---|---|---|---|---|---|---|
| BASE | 24.7 | 24.7 | 24.7 | 24.7 | 24.7 | 24.7 | 24.7 | 24.7 |
| SORBITOL | 50.0 | 50.0 | 35.0 | 10.0 | 35.0 | 10.0 | 35.0 | 10.0 |
| MANNITOL | 9.4 | 7.0 | 9.4 | 9.4 | 7.0 | 7.0 | 9.0 | 9.0 |
| GLYCERIN | 2.0 | 2.0 | 2.0 | 2.0 | 2.0 | 2.0 | 2.0 | 2.0 |
| LECITHIN | 0.2 | 0.2 | 0.2 | 0.2 | 0.2 | 0.2 | 0.2 | 0.2 |
| PEPPERMINT FLAVOR | 1.4 | 1.4 | 1.4 | 1.4 | 1.4 | 1.4 | 1.4 | 1.4 |
| APM | 0.3 | 0.3 | 0.3 | 0.3 | 0.3 | 0.3 | 0.3 | 0.3 |
| LYCASIN | — | 14.4 | — | — | 14.4 | 14.4 | — | — |
| LIQUID SORBITOL | 12.0 | — | 12.0 | 12.0 | — | — | — | — |
| POS | — | — | 15.0 | 40.0 | 15.0 | 40.0 | 15.0 | 40.0 |
| PALATINOSE SYRUP | — | — | — | — | — | — | 12.4 | 12.4 |

Figure 2:
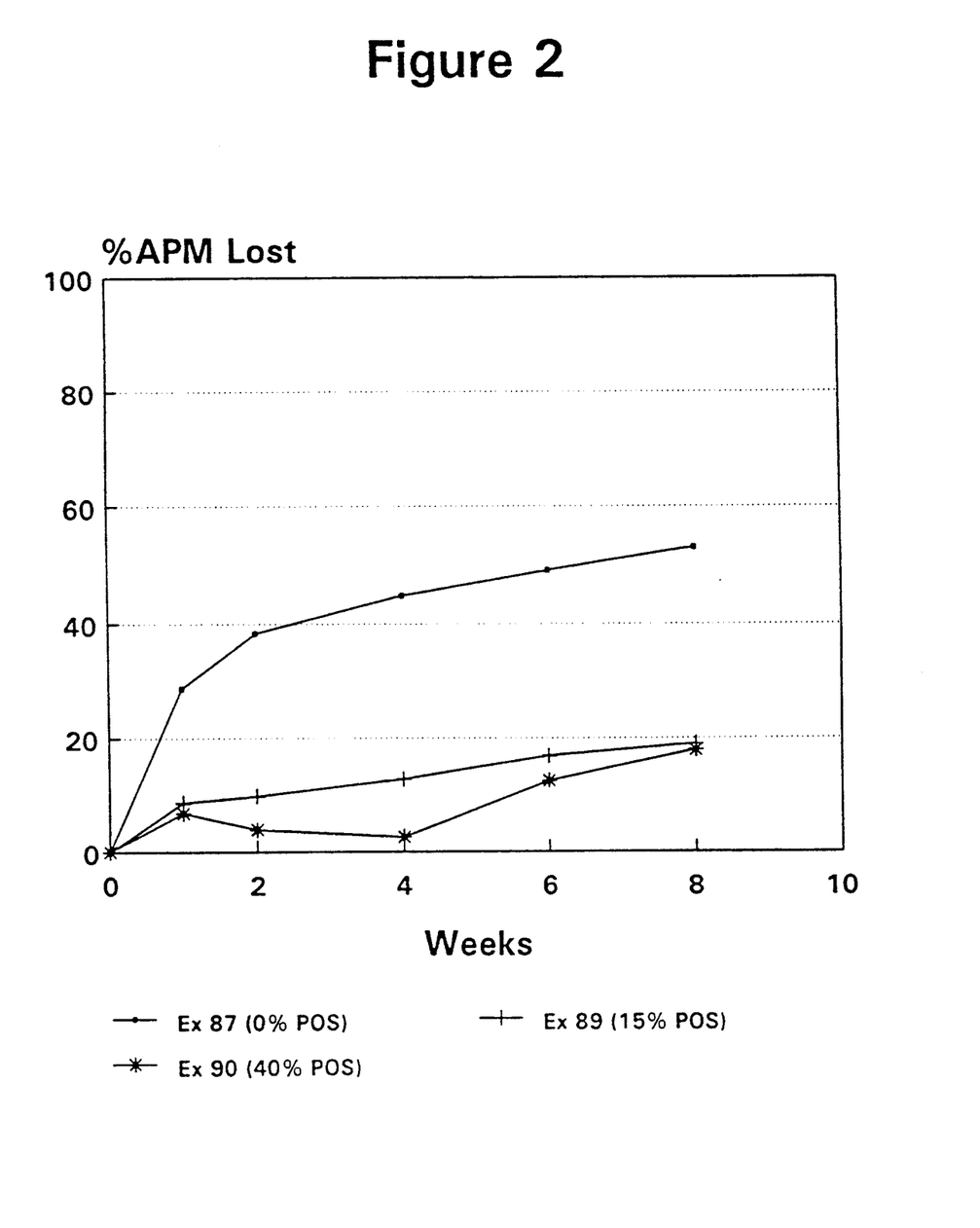
FIG. 2 shows test results of aspartame stability in gums made with sorbitol liquid and POS.
Figure 3:
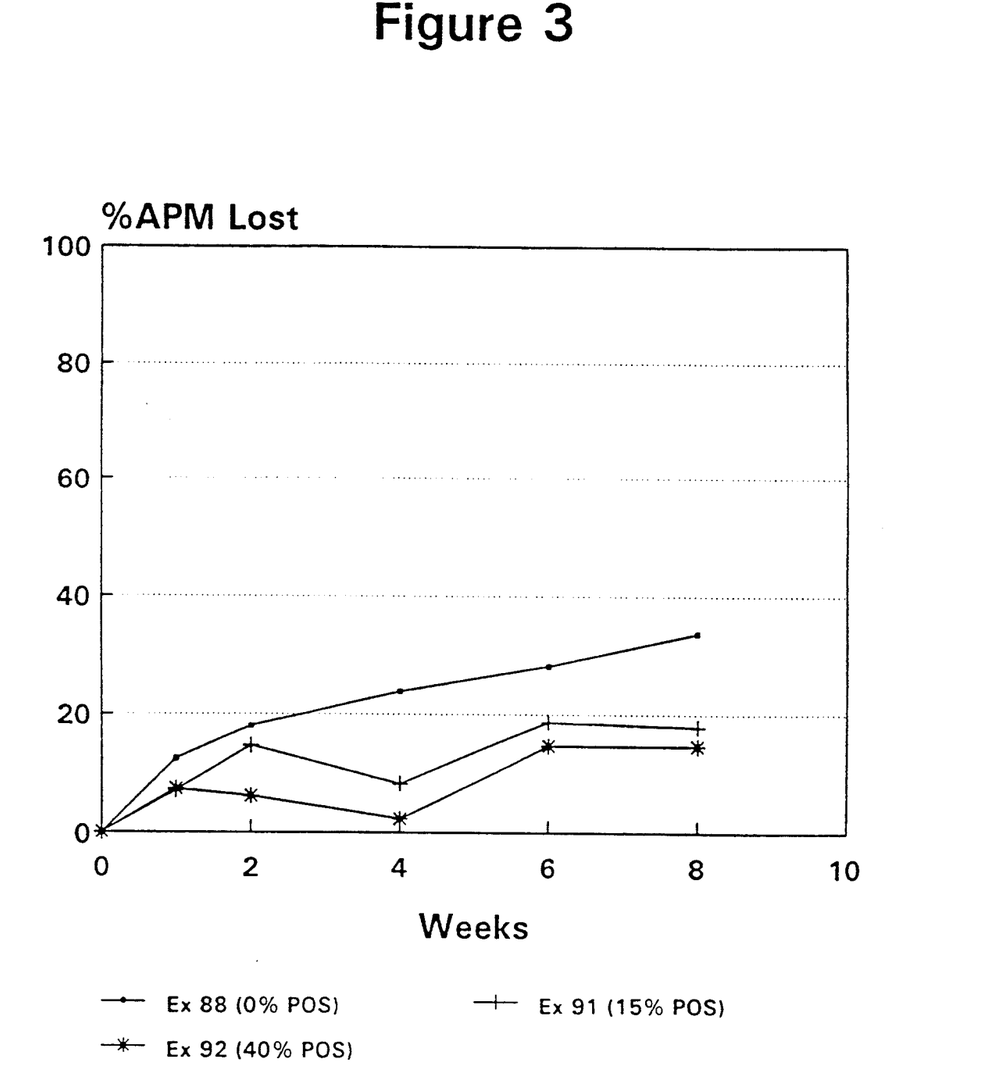
FIG. 3 shows test results of aspartame stability in gums made using Lycasin brand HSH syrup and POS.
Figure 4:
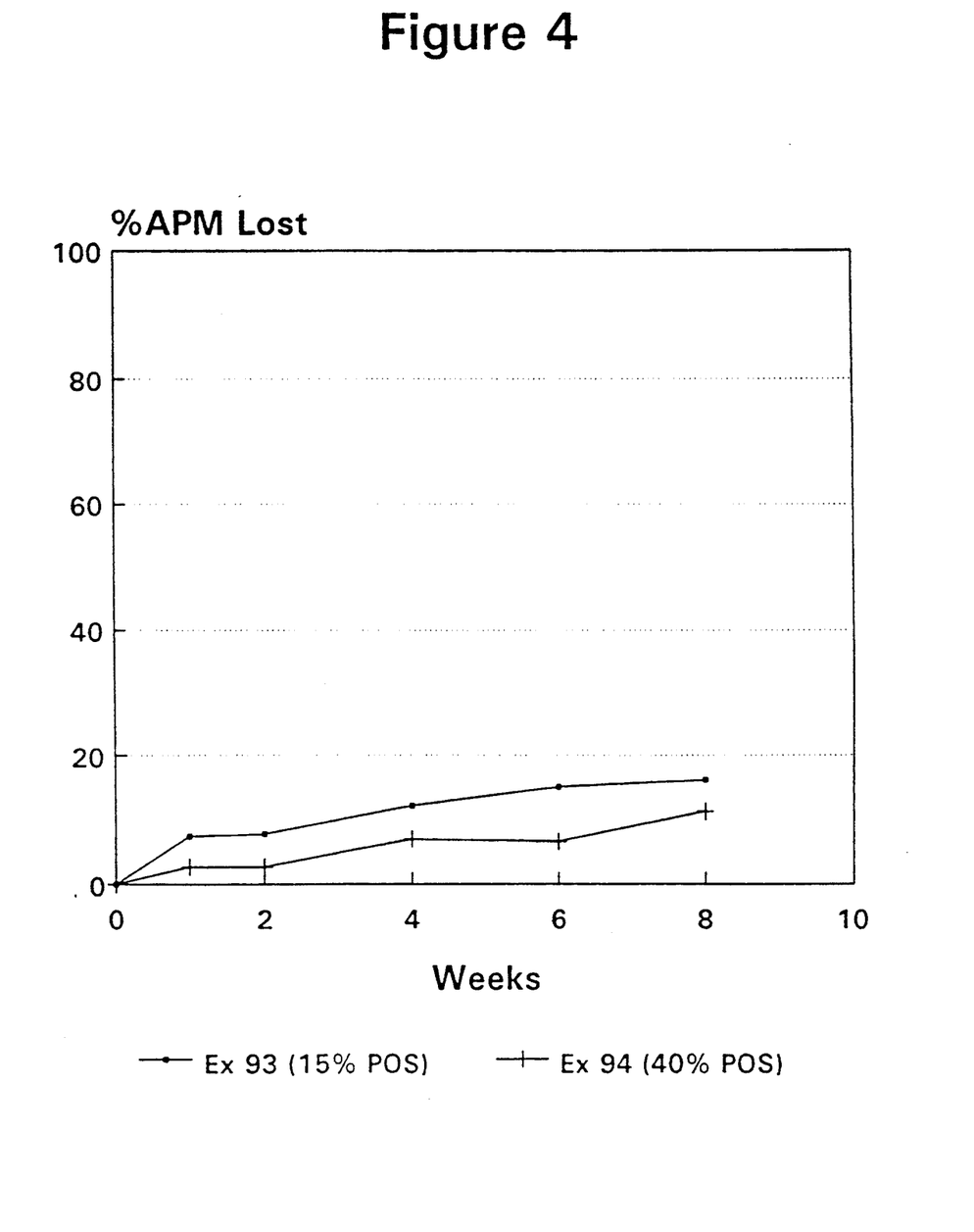
FIG. 4 shows test results of aspartame stability in gums made using POS and palatinose syrup.

These formulas were made in a conventional lab mixer in a conventional manner and formed into square pellets. Samples of each formula were placed in six sealed pouches and stored at 85° F. for 0, 1, 2, 4, 6 and 8 weeks. Samples were then removed and analyzed for APM to determine degradation. The test results are shown in FIGS. 2, 3 and 4 for gum made with various levels of POS and either sorbitol liquid, Lycasin brand HSH syrup, or palatinose syrup (containing palatinose, trehalulose and other carbohydrates), respectively. Results show that in each type of formulation, POS improves APM stability significantly as compared to when palatinose is used in the same type of formulation (FIG. 1). As seen in FIGS. 2, 3 and 4, after eight weeks of storage at 85° F., over 80% of the originally formulated amount of aspartame remained undecomposed in the gum formulas that included POS. As seen in FIGS. 2 and 3, where a direct comparison can be made between samples with POS and without POS, the POS was effective to stabilize the aspartame such that between about 15% and 40% less aspartame decomposed than decomposed where the POS was not included in the gum. In fact, the formulated amount of aspartame could have been reduced about 20% to about 45% and an equal amount of aspartame could have been recovered compared to the formulas where POS was not added.

EXAMPLES 95–98

The following gum formulations were made:

|  | EX. 95 | EX. 96 | EX. 97 | EX. 98 |
|---|---|---|---|---|
| BASE | 24.7 | 24.7 | 24.7 | 24.7 |
| SORBITOL | 35.0 | 35.0 | 35.0 | 35.0 |
| MANNITOL | 9.4 | 9.4 | 9.4 | 9.4 |
| GLYCERIN | 2.0 | 5.0 | 8.0 | 11.0 |
| LECITHIN | 0.2 | 0.2 | 0.2 | 0.2 |
| PEPPERMINT FLAVOR | 1.4 | 1.4 | 1.4 | 1.4 |
| APM | 0.3 | 0.3 | 0.3 | 0.3 |
| LIQUID SORBITOL | 12.0 | 9.0 | 6.0 | 3.0 |
| POS | 15.0 | 15.0 | 15.0 | 15.0 |

Figure 5:
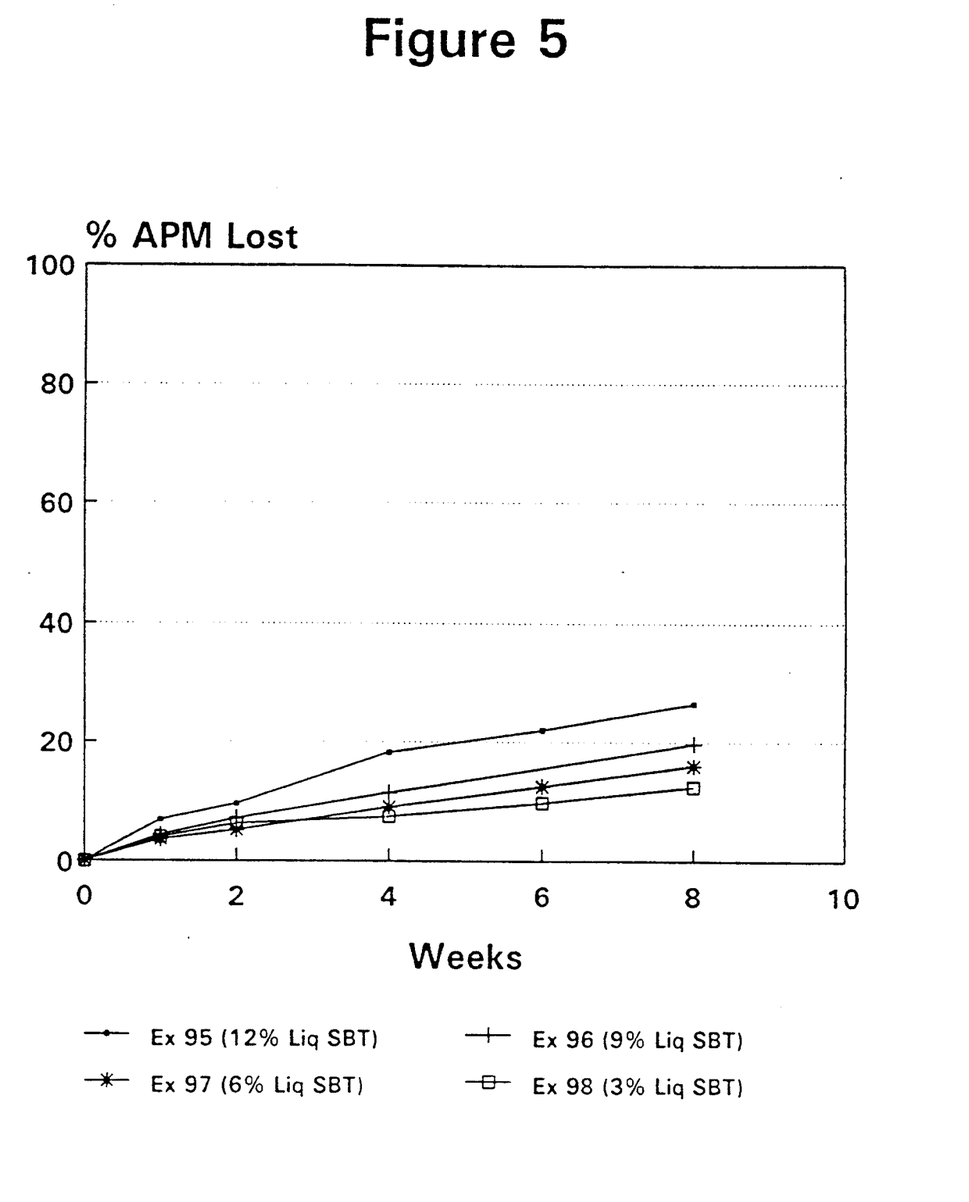
FIG. 5 shows test results of aspartame stability in gums made with 15% POS and various levels of sorbitol liquid.

These formulas were made in a conventional lab mixer in a conventional manner and formed into square pellets. Samples of each formula were placed in six sealed pouches and stored at 85° F. for 0, 1, 2, 4, 6 and 8 weeks. Samples were then removed and analyzed for APM to determine degradation. The test results, shown in FIG. 5, demonstrate that at 15% POS, all of the formulas had fairly good aspartame stability, with over 60% of the original aspartame still available after 8 weeks of storage. As an aside, the results also demonstrate how reduced levels of sorbitol liquid, and consequentially reduced levels of water, gives further improved stability of APM.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention, therefore, is indicated by the appended claims rather than by the foregoing description. All changes which come within the meaning and range of equivalency of the claims are to be embraced within their scope.

I claim:

1. A chewing gum composition comprising sweetness imparting amounts of unencapsulated aspartame and an effective amount of palatinose oligosaccharide to stabilize said aspartame against decomposition during storage at 85° F. for eight weeks whereby at least 5% less aspartame decomposes into non-sweetening derivatives that would have decomposed if the palatinose oligosaccharide were not included in the gum composition.

2. The chewing gum composition of claim 1 wherein the gum composition comprises at least 10% palatinose oligosaccharide.

3. The chewing gum composition of claim 1 wherein the gum composition comprises about 0.005% to about 1% unencapsulated aspartame.

4. The chewing gum composition of claim 1 wherein the palatinose oligosaccharide is effective such that after eight weeks of storage at 85° F., over 80% of the unencapsulated aspartame originally formulated in the gum composition remains undecomposed.

5. A chewing gum composition comprising from about 5% to about 95% of a gum base; about 5% to about 90% of a bulking agent; about 0.1% to about 10% of a flavor agent and a formulated amount of unencapsulated aspartame
wherein the bulking agent includes palatinose oligosaccharide in amounts effective to stabilize said aspartame when said chewing gum is stored at 85° F. for at least eight weeks, at least 60% of the original, formulated amount of said aspartame is recoverable,
said formulated amount of aspartame being about 10% to about 50% less than the amount of said aspartame which would have been needed to recover an equal amount of aspartame in the absence of the palatinose oligosaccharide stabilizer.

6. The chewing gum composition of claim 5 wherein the amount of palatinose oligosaccharide employed is between about 10% and 60% of the composition.

7. The chewing gum composition of claim 5 wherein the formulated amount of aspartame comprises between about 0.005% and about 1% of the composition.

8. A process for preparing and storing a chewing gum composition comprising formulating and storing a gum composition comprising from about 5% to about 95% of a gum base; about 5% to about 90% of a bulking agent; about 0.1% to about 10% of a flavor agent and a formulated, and at least partially sweetening, amount of unencapsulated aspartame,
the bulking agent including, as a stabilizer for said aspartame, palatinose oligosaccharide in such amounts as to stabilize said aspartame so as to allow for the recovery from said chewing gum composition of at least 75% of said formulated amount of aspartame after normal commercial storage of said chewing gum composition for at least eight weeks.

9. A process for reducing the amount of unencapsulated aspartame needed to be formulated into a chewing gum product comprising from about 5% to about 95% of a gum base; about 5% to about 90% of a bulking agent; and about 0.1% to about 10% of a flavor agent, wherein the gum product is at least partially sweetened therewith,
and while still providing for a recoverable aspartame content of X% after the ambient commercial storage of said chewing gum product for at least eight weeks,
said X% being at least 20% of the reduced amount of said aspartame to be formulated into said chewing gum product,
which comprises:
formulating said chewing gum product with an amount of aspartame which is about 10 to 50% less than the amount of aspartame which would have been needed in said chewing gum product, in the absence of a stabilizer for said aspartame, to provide for a recoverable level of X% of aspartame after said storage period, and
with, as a stabilizer for such reduced amount of aspartame, palatinose oligosaccharide in such amounts as to effectively stabilize said aspartame and provide for a recoverable aspartame content of X% after said storage period.

10. A chewing gum composition comprising from about 5% to about 95% of a gum base; about 5% to about 90% of a bulking agent; about 0.1% to about 10% of a flavor agent and an admixture of
a) about 0.005% to about 1% of unencapsulated aspartame, and b) the bulking agent comprising palatinose oligosaccharide in an amount effective to stabilize said aspartame when said chewing gum composition is stored at 85° F. for at least eight weeks so that at least 60% of said (a) amount of aspartame is then recoverable.

11. The chewing gum composition of claim 10 wherein the chewing gum comprises:
   a) about 20% to about 35% gum base; and
   b) about 10% to about 50% palatinose oligosaccharide.

12. The chewing gum composition of claim 10 wherein after eight weeks of storage over 80% of the original aspartame is recoverable.

13. A chewing gum composition comprising:
   a) about 5% to about 95% gum base;
   b) about 0.1% to about 10% of a flavoring agent,
   c) about 5% to about 90% bulking agent, the bulking agent comprising at least in part palatinose oligosaccharide, and
   d) sweetening amounts of aspartame.

14. The chewing gum composition of claim 13 wherein the gum comprises at least 10% palatinose oligosaccharide.

15. The chewing gum composition of claim 13 wherein the gum comprises at least 15% palatinose oligosaccharide.

* * * * *

UNITED STATES PATENT AND TRADEMARK OFFICE
CERTIFICATE OF CORRECTION

PATENT NO. : 5,296,244
DATED : March 22, 1994
INVENTOR(S) : Robert J. Yatka

Page 1 of 2

It is certified that error appears in the above-indentified patent and that said Letters Patent is hereby corrected as shown below:

ON THE TITLE PAGE

In column 1, after "Filed: Oct. 30, 1992" add the following:

--Related U.S. Application Data

Continuation-in-part of application Ser. No. PCT/US92/05217, Jun. 19, 1992, which is a continuation-in-part of application Ser. No. PCT/US91/04349, Jun. 19, 1991.--

In column 2, line 2, delete "4,695,326 palatinose" and substitute --4,695,326. Palatinose--.

In column 3, line 29, delete "6-0-α-Dv" and substitute --6-0-α-D--.

In column 7, line 56, after "described" delete ".".

In column 8, line 1, delete "demonstrates" and substitute --demonstrate--.

In column 8, line 6 of Table 3, delete:
 "FLAVOR     2.0      1.0      1.0" and substitute
 --FLAVOR    1.0      1.0      1.0--.

UNITED STATES PATENT AND TRADEMARK OFFICE
CERTIFICATE OF CORRECTION

PATENT NO. : 5,296,244
DATED      : March 22, 1994
INVENTOR(S) : Robert J. Yatka It is certified that error appears in the above-indentified patent and that said Letters Patent is hereby corrected as shown below:

In column 9, line 51, delete "co precipitated" and substitute --co-precipitated--.

In column 12, line 47, delete "18-8" and substitute --1-8--.

In column 12, line 47, delete "18-8" and substitute --1-8--.

In column 14, line 22, delete "0, i, 2, 4, 6" and substitute --0, 1, 2, 4, 6--.

<u>IN THE CLAIMS</u>

In claim 6, line 3, after "and" insert --about--.

In claim 9, line 17, after "to" insert --about--.

Signed and Sealed this

Twenty-ninth Day of November, 1994

Attest:

BRUCE LEHMAN

*Attesting Officer*      *Commissioner of Patents and Trademarks*